United States Patent
Cakulev et al.

(10) Patent No.: US 11,638,231 B2
(45) Date of Patent: Apr. 25, 2023

(54) METHOD AND SYSTEM FOR BINDING INFORMATION SERVICE

(71) Applicant: Verizon Patent and Licensing Inc., Basking Ridge, NJ (US)

(72) Inventors: Violeta Cakulev, Millburn, NJ (US); Hossein M. Ahmadi, Parsippany, NJ (US); Ali Imdad Malik, East Brunswick, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 51 days.

(21) Appl. No.: 17/479,143

(22) Filed: Sep. 20, 2021

(65) Prior Publication Data
US 2023/0090589 A1    Mar. 23, 2023

(51) Int. Cl.
*H04W 60/04*   (2009.01)
*H04W 8/22*    (2009.01)
*H04W 60/06*   (2009.01)
*H04W 76/10*   (2018.01)

(52) U.S. Cl.
CPC .......... *H04W 60/04* (2013.01); *H04W 8/22* (2013.01); *H04W 60/06* (2013.01); *H04W 76/10* (2018.02)

(58) Field of Classification Search
CPC ....... H04W 60/04; H04W 8/22; H04W 60/06; H04W 76/10
See application file for complete search history.

(56) References Cited

U.S. PATENT DOCUMENTS

| 11,283,883 | B1* | 3/2022 | Krishan | H04M 15/8228 |
| 2010/0238864 | A1* | 9/2010 | Hirano | H04W 60/005 370/328 |
| 2019/0158408 | A1* | 5/2019 | Li | H04L 67/104 |
| 2019/0260834 | A1* | 8/2019 | Thiebaut | H04L 67/14 |
| 2019/0357301 | A1* | 11/2019 | Li | H04W 80/10 |
| 2020/0221541 | A1* | 7/2020 | Yan | H04W 48/16 |
| 2022/0022101 | A1* | 1/2022 | Wang | H04M 15/66 |
| 2022/0070702 | A1* | 3/2022 | Puente Pestaña et al. | H04W 8/186 |

* cited by examiner

*Primary Examiner* — Luat Phung

(57) ABSTRACT

A method, a system, and a non-transitory storage medium are described in which an binding information service is provided. The binding information service may include applying one or multiple criteria to binding information stored by a binding service function. The binding information service may identify candidate binding information instances that may need deletion based on the one or multiple criteria. The binding information service may interrogate a policy control network device as to the current registrability of the binding information. The binding information service may delete or maintain the binding information based on a result of the interrogation. The binding information service may also include directing the binding service function to delete binding information based on one or multiple criteria. The one or multiple criteria may relate to the age of the binding information or a last time the registrability of the binding information was confirmed.

20 Claims, 7 Drawing Sheets

METHOD AND SYSTEM FOR BINDING INFORMATION SERVICE

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
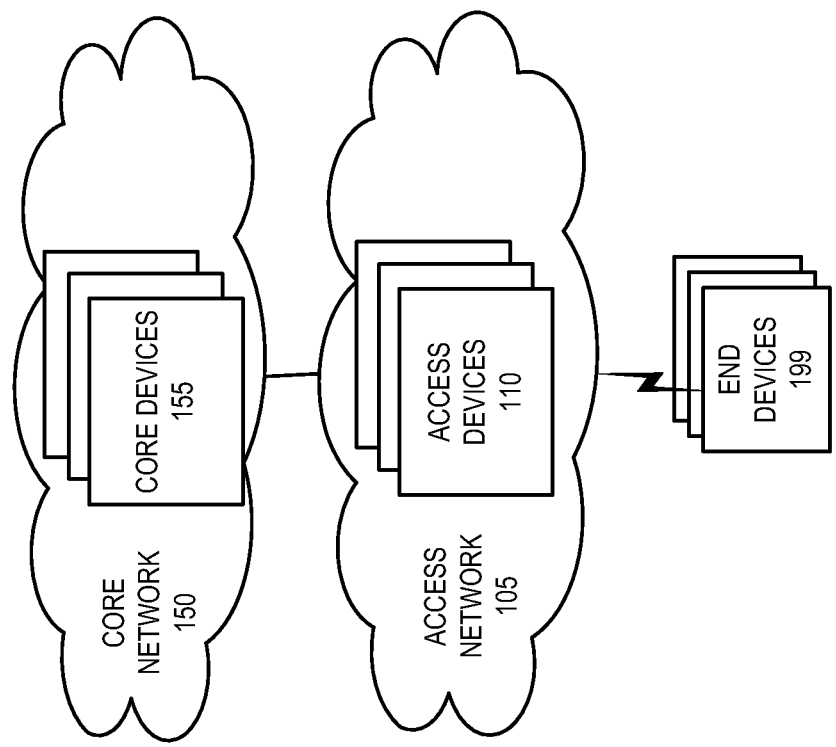
FIG. 1 is a diagram illustrating an exemplary environment in which an exemplary embodiment of a binding information service may be implemented.

The following detailed description refers to the accompanying drawings. The same reference numbers in different drawings may identify the same or similar elements. Also, the following detailed description does not limit the invention.

In a Fifth Generation (5G) core (5GC) network or another type of network, a policy control function (PCF) or another type of policy control network device may provide various types of policies to another network device, network element, or (physical or virtual) network function (referred to herein as "network device"). For example, the PCF may provide packet data unit (PDU) session management policy control policies to a session management function (SMF) and access and mobility-related policy control information to an access and mobility management function (AMF). The PCF may also provide access selection and PDU session related policies to end devices (e.g., user equipment (UE)). The SMF and the AMF may select different PCFs.

A binding service function (BSF) may ensure that an application function (AF), which may want to send policies about an end device, may reach the correct PCF storing the corresponding UE and/or PDU session information, for example, when multiple and separately addressable PCFs may be deployed.

There may be a procedure for a PCF to register, update, and remove UE and/or PDU session information in a BSF. For example, an SM-PCF may register, update, and remove PDU session binding information in the BSF. Even so, when the PCF fails to deregister the UE and/or PDU session information from the BSF, the UE and/or PDU session information may remain available and active in the BSF. As an example, the PCF may encounter transport errors, a PCF failure, and/or another type of problem that may inhibit or prevent the PCF from (timely) deregistering the UE and/or PDU session information. Further, the BSF is not configured to account for such failures or issues related to removal of the binding information. For example, the BSF may not proactively query the PCF or take other measures to ensure that the UE and/or PDU session information should remain registered and available for other network devices. In this regard, the BSF may not detect binding information that should be removed, much less delete or de-register the binding information.

According to exemplary embodiments, a binding information service is provided. According to an exemplary embodiment, the binding information service may include a binding removal procedure that removes binding information from the BSF. For example, a PCF may detect binding information that should be removed at the BSF based on one or multiple criteria, as described herein. In response, the PCF may transmit a message, which when received by a BSF, may cause the BSF to delete the binding information.

According to another exemplary embodiment, a BSF may detect binding information that should be removed. For example, the BSF may identify candidate binding information, which may be subject to removal, based on one or multiple criteria, as described herein. In response, the BSF may transmit a message, which may indicate potential removal of binding information, to a PCF. The PCF may determine that the binding cannot be found, and the PCF may transmit a response message, which when received by the BSF, may cause the BSF to delete the binding information. Otherwise, the PCF may determine that the binding is found, and the PCF may transmit a response message, which when received by the BSF, may cause the BSF to maintain the binding information.

In view of the foregoing, the binding information service may enable network devices to obtain accurate and/or current binding information. For example, failure to remove binding information may result in a BSF providing the binding information to AF or another type of network device with inaccurate PCF information that may lead to an end device denied a service, waste of end device and network resources, and/or other types of failures. The binding information service may improve PDU session management, policy control, access and mobility management, UE route selection, and other end device and/or network-related management operations.

FIG. 1 is a diagram illustrating an exemplary environment 100 in which an exemplary embodiment of the binding information service may be implemented. As illustrated, environment 100 may include an access network 105 and a core network 150. Access network 105 may include access devices 110, and core network 150 may include core devices 155. Environment 100 may further include end devices 199.

The number, type, and arrangement of networks illustrated in environment 100 are exemplary. Additionally, or alternatively, other networks not illustrated in FIG. 1 may be included in environment 100, such as an xHaul network (e.g., a fronthaul network, a mid-haul network, a backhaul network, etc.), a transmit network (e.g., Signaling System No. 7 (SS7), etc.), an application service layer network, or another type of network.

The number, the type, and the arrangement of network devices in access network 105, and core network 150, as illustrated and described, are exemplary. The number of end devices 199 is exemplary. A network device may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the binding information service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, information elements (IE), attribute value pairs (AVPs), objects, parameters, or other form of data instance) between network devices and the binding information service logic of the network device, as described herein. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, O-RAN Reference Architecture, a virtualized RAN (vRAN), a self-organizing network (SON), etc.). Access network 105 may include a wired network, an optical network, or another type of network that may provide communication with core network 150, for example.

Access network 105 may include different and multiple functional splitting, such as options 1, 2, 3, 4, 5, 6, 7, or 8 that relate to combinations of access network 105 and core network 120 including an EPC network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, an MCG split bearer, an SCG bearer service, E-UTRA-NR (EN-DC), NR-E-UTRA-DC (NE-DC), NG RAN E-UTRA-NR DC (NGEN-DC), or another type of DC (e.g., multi-radio access technology (RAT) (MR-DC), single-RAT (SR-DC), etc.), carrier aggregation (CA) (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA) (e.g., non-standalone NR, non-standalone E-UTRA, etc.), SA (e.g., standalone NR, standalone E-UTRA, etc.), etc.).

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 GHz, above 6 GHz, licensed radio spectrum, unlicensed radio spectrum, C-band, higher than mm wave, etc.), and/or other attributes or technologies of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), a future generation wireless access device (e.g., a 6G wireless station, a 7G wireless station, or another generation of wireless station), another type of wireless node (e.g., a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. According to some exemplary implementations, access devices 110 may include a combined functionality of multiple RATs (e.g., 4G and 5G functionality).

Core network 150 may include one or multiple networks of one or multiple types and technologies. According to an exemplary embodiment, core network 150 includes a complementary network of access network 105. For example, core network 150 may be implemented to include a 5GC network (also known as next generation core (NGC) network) (or other type of a future generation network), an EPC of an LTE network, an LTE-Advanced (LTE-A) network, and/or an LTE-A Pro network. Core network 150 may include a legacy core network.

Depending on the implementation, core network 150 may include various types of network devices, such as core devices 155. For example, core devices 155 may include a user plane function (UPF), a Non-3GPP Interworking Function (N3IWF), an AMF, an SMF, a unified data management (UDM) device, a unified data repository (UDR) device, an authentication server function (AUSF), a network slice selection function (NSSF), a network repository function (NRF), a PCF, an AM PCF, an SM PCF, a BSF, a network data analytics function (NWDAF), a network exposure function (NEF), a lifecycle management (LCM) device, an AF, a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy control rules function (PCRF), a policy control enforcement function (PCEF), and/or a charging system (CS). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network. According to an exemplary embodiment, a portion of core devices 155 may include logic that provides the binding information service, as described herein.

End device 199 may include a device that has computational and wireless communicative capabilities. Depending on the implementation, end device 199 may be a mobile device, a portable device, a stationary device, a device operated by a user (e.g., UE, etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, or other type of wireless device. End device 199 may be configured to execute various types of software (e.g., applications, programs, etc.). The number and the types of software may vary among end devices 199. End device 199 is not to be considered a network device, as described herein.

Figure 2:
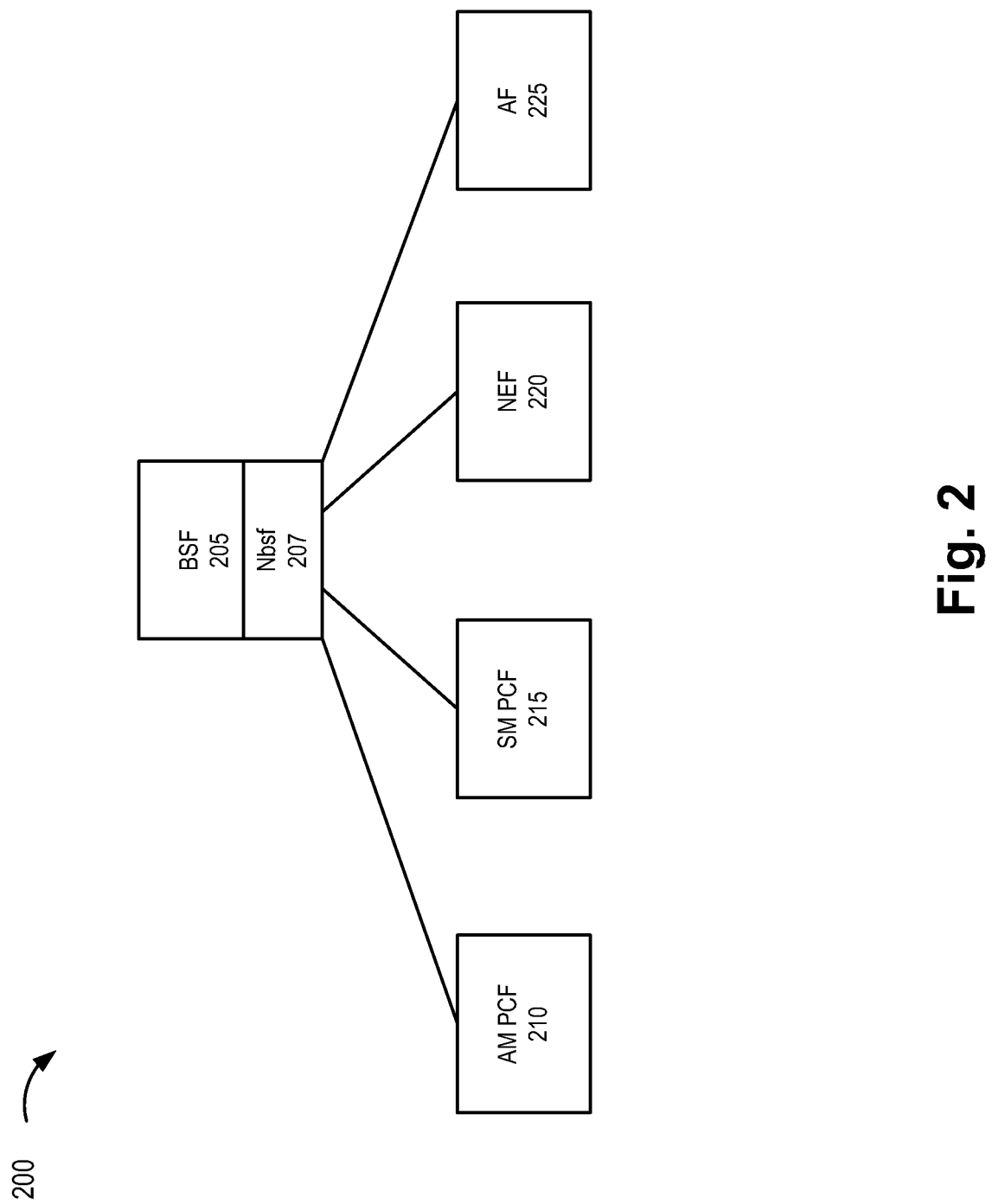
FIG. 2 is a diagram illustrating another exemplary environment in which an exemplary embodiment of the binding information service may be implemented.

FIG. 2 is a diagram illustrating another exemplary environment 200 in which an exemplary embodiment of the binding information service may be implemented. As illustrated, environment 200 may include a BSF 205, an AM PCF 210, an SM PCF 215, a NEF 220, and an AF 225. According to other exemplary embodiments, environment 200 may include additional, different, and/or fewer network devices. For example, according to other exemplary embodiments, there may be additional dedicated PCF types, such as a UE PCF that provides policy control in relation to UE policies (e.g., access network discovery and selection, UE route selection, network slicing, etc.) and/or another dedicated type of PCF. According to still other exemplary embodiments, environment 200 may include a PCF that includes functionalities of multiple dedicated PCFs. For example, the PCF may include two or more of an AM PCF, an SMF, or a UE PCF. In either case, an integrated PCF or a dedicated PCF may include the binding information service, as described herein. Additionally, or alternatively, in addition to NEF 220 and AF 225, there may be other network devices (e.g., other core devices 155 and/or network devices of a network external from access network 105 and/or core network 150) that may use the binding information service, as described herein.

The number, the type, and the arrangement of network devices in environment 200, as illustrated and described, are exemplary. According to some exemplary embodiments, BSF 205 may be a standalone network device. According to other exemplary embodiments, the functionality of BSF 205 may be provided individually or in combination with other network devices of core network 150 (e.g., a UDR, an SMF, a PCF, an NRF, etc.) (not illustrated).

According to an exemplary embodiment, BSF 205, AM PCF 210, SM PCF 215, NEF 220, and/or AF 225 may each include functions and/or services specified and/or defined by a standards body such as 3GPP, 3GPP2, ITU, ETSI, GSMA, or other types of standards, and/or functions and/or services of a proprietary nature. For example, BSF 205 may include a network device that provides a binding service. The binding service may include a registering service and de-registering service for binding information, and a binding information service that discovers selected policy control network devices, such as selected PCFs.

According to an exemplary embodiment, in contrast to a standard or proprietary functionality of a BSF, BSF 205 includes logic that provides the binding information service, as described herein. For the sake of description, BSF 205 may include an Nbsf interface 207 that supports communication between BSF 205 and AM PCF 210, SM PCF 215, NEF 220, and AF 225. According to an exemplary embodiment, Nbsf interface 207 may support a binding service that includes an exemplary embodiment of the binding information service, as described herein. According to other exemplary embodiments, an interface other than an Nbsf interface (e.g., in terms of functionality and/or nomenclature) may be implemented.

AM PCF 210 may include a network device that provides policy control functionalities and information relating to access and mobility management. AM PCF 210 may register, update, and deregister binding information with BSF 205. For example, the binding information may include a network address (e.g., an Internet Protocol (IP) address, a Media Access Control (MAC) address, etc.) of end device 199 and an identifier of AM PCF 210. The binding information may include other types of information, such as a Data Network Name (DNN), a Subscription Permanent Identifier (SUPI), a Generic Public Subscription Identifier (GPSI), Single Network Slice Selection Assistance Information (S-NSSAI), and/or other types of identifiers (e.g., a Globally Unique Temporary Identifier (GUTI), a Permanent Equipment Identifier (PEI), a Subscription Concealed Identifier (SUCI), a PDU session identifier, etc.). AM PCF 210 may register and deregister binding information associated with end device 199. According to an exemplary embodiment, AM PCF 210 may include logic that provides binding information service, as described herein.

SM PCF 215 may include a network device that provides policy control functionalities and information relating to session management, such as QoS and charging rules, and network slice selection information associated with end device 199. SM PCF 215 may register, update, and deregister binding information with BSF 205. For example, the binding information may include a network address (e.g., an IP address, a MAC address, etc.) of end device 199 and an identifier of SM PCF 215. The binding information may include other types of information, such as a DNN, a SUPI, a GPSI, S-NSSAI, and/or other types of identifiers (e.g., a GUTI, a PEI, a SUCI, etc.). SM PCF 215 may register and deregister binding information associated with end device 199 and PDU sessions. According to an exemplary embodiment, SM PCF 215 may include logic that provides binding information service, as described herein.

NEF 220 may include a network device that may expose services, capabilities, and events provided by other network devices, securely provision information from external network devices, and translate internal and external information relative to core network 150.

AF 225 may include a network device that may support application influence on traffic routing, accessing NEF 220, and interacting with the policy framework for policy control. AF 225 may or may not be a third party network device (e.g., relative to end device 199 and core network provider of core network 150).

Figure 3A:
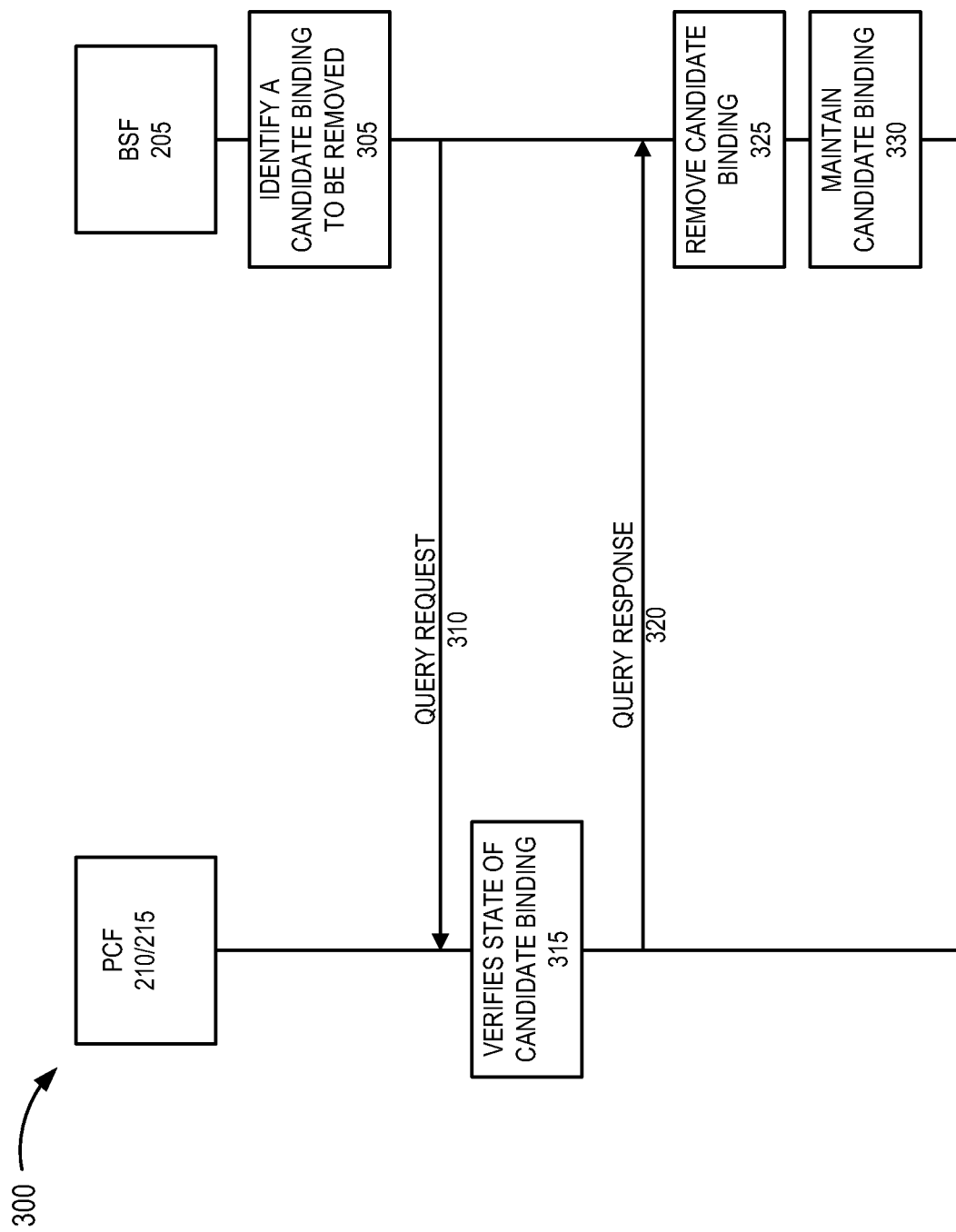
FIG. 3A is a diagram illustrating an exemplary process of an exemplary embodiment of the binding information service.

FIG. 3A is a diagram illustrating an exemplary process 300 of an exemplary embodiment of the binding information service. Referring to FIG. 3A, BSF 205 may store multiple instances of binding information. Binding information may pertain to PDU sessions and associated end devices 199. According to an exemplary embodiment, BSF 205 may monitor some or all binding information instances and may identify a candidate binding information instance that may need to be removed (e.g., deleted) based on one or multiple criteria. For example, BSF 205 may identify the candidate binding information based on an age of the binding information instance (e.g., an interim period since the binding was created). According to another example, BSF 205 may identify the candidate binding information instance based on a period since the binding information instance was confirmed as still active or registrable after creation or after a last confirmation of activity or registrability. BSF 205 may be configured with one or multiple threshold values pertaining to the one or multiple criteria, as described herein.

According to some exemplary embodiments, the one or multiple criteria may also pertain to a type of UE, a type of PDU session, a type of network slice, and/or some other factor of relevance pertaining to a PDU session (e.g., location of end device 199, high density area, low density area, etc.). As an example, the criterion of age of the binding information instance may vary among different types of end devices 199 (e.g., IoT, gaming device, or another type of end device 199), different types of PDU sessions (e.g., IoT, video streaming, continuous traffic versus intermittent traffic, etc.), and/or different types of network slices (e.g., high throughput, low latency, or other types of performance metrics). BSF 205 may make such determinations based on the binding information instance (e.g., S-NSSAI, PDU session information, DNN, IP address, etc.) and/or an extrapolation based on the binding information.

In response to identifying a candidate binding that may be subject to being removed, BSF 205 may generate and transmit a query request 310 to a PCF to which the binding information is registered, such as AM PCF 210 or SM PCF 215 (illustrated as PCF 210/215 in FIG. 3A). Query request 310 may include a binding identifier that identifies the candidate binding information and/or a network address of the candidate binding information (e.g., a Uniform Resource Indicator (URI)). Query request 310 may also include query information that requests confirmation that the candidate binding information is still registerable or active.

In response to receiving query request 310, PCF 210/215 may verify the state of the candidate binding. For example, PCF 210/215 may perform a lookup of binding information based on the binding identifier and/or the URI. Based on a result of the lookup, PCF 210/215 may determine whether the candidate binding information is still registrable or active 315. As further illustrated, PCF 210/215 may generate a query response 320 to BSF 205. For example, when PCF 210/215 determines that the candidate binding information is not active or registrable, query response 320 may include data indicating that the binding information is not found or that the binding information is no longer registrable or active. Query response 320 may include the binding identifier and/or the URI included in the query request 310. According to another example, when PCF 210/215 determines that the candidate information is still active or registrable, query response 320 may include data indicating that the binding information was located or a confirmation that the binding information is registrable or active. Query response 320 may also include the binding identifier and/or the URI.

As further illustrated, in response to receiving query response 320, BSF 205 may perform different operations. For example, when query response 320 indicates that the candidate binding information is not active or registrable, BSF 205 may remove the candidate binding information 325. According to another example, when query response 320 indicates that the candidate binding information is registrable or active, BSF 205 may maintain (e.g., continue to store) the candidate binding information 330. Additionally, BSF 205 may generate and store confirmation data that may include data indicating that the binding information was confirmed as being registrable or active and date and timestamp information associated with the confirmation.

FIG. 3A is a diagram illustrating an exemplary process 300 of an exemplary embodiment of the binding information service, however, according to other exemplary embodiments, process 300 may include additional, fewer, or different operations and/or messages. According to some exemplary embodiments, query request 310 and query response 320 may be implemented as a Hypertext Transfer Protocol (HTTP) message. For example, query request 310 may be implemented as an HTTP GET, and query response 320 may be implemented as an HTTP 200 OK (e.g., when the PCF determines that the binding information is found or still registrable) and as an HTTP DELETE or an HTTP 400 (e.g., when the binding information is not found or no longer registrable). According to other exemplary embodiments, query request 310 and query response 320 may be implemented according to a protocol different from HTTP.

According to some exemplary scenarios a PCF may remove binding information stored by the PCF, but does not successfully cause the binding information to be removed at a BSF. For example, PCF 210/215 may generate and transmit a delete request or a deregister request to BSF 205, but such request may not be received by BSF 205 for some reason (e.g., packet drop, faulty communication link, etc.). As such, the binding information stored by BSF 205 may not be deleted, and consequently may not correspond to the current state of the information of PCF 210/215. In this case, process 300 may ensure the accuracy and/or current state of registrability of the binding information stored at BSF 205 and various types of PCFs, as described herein.

Figure 3B:
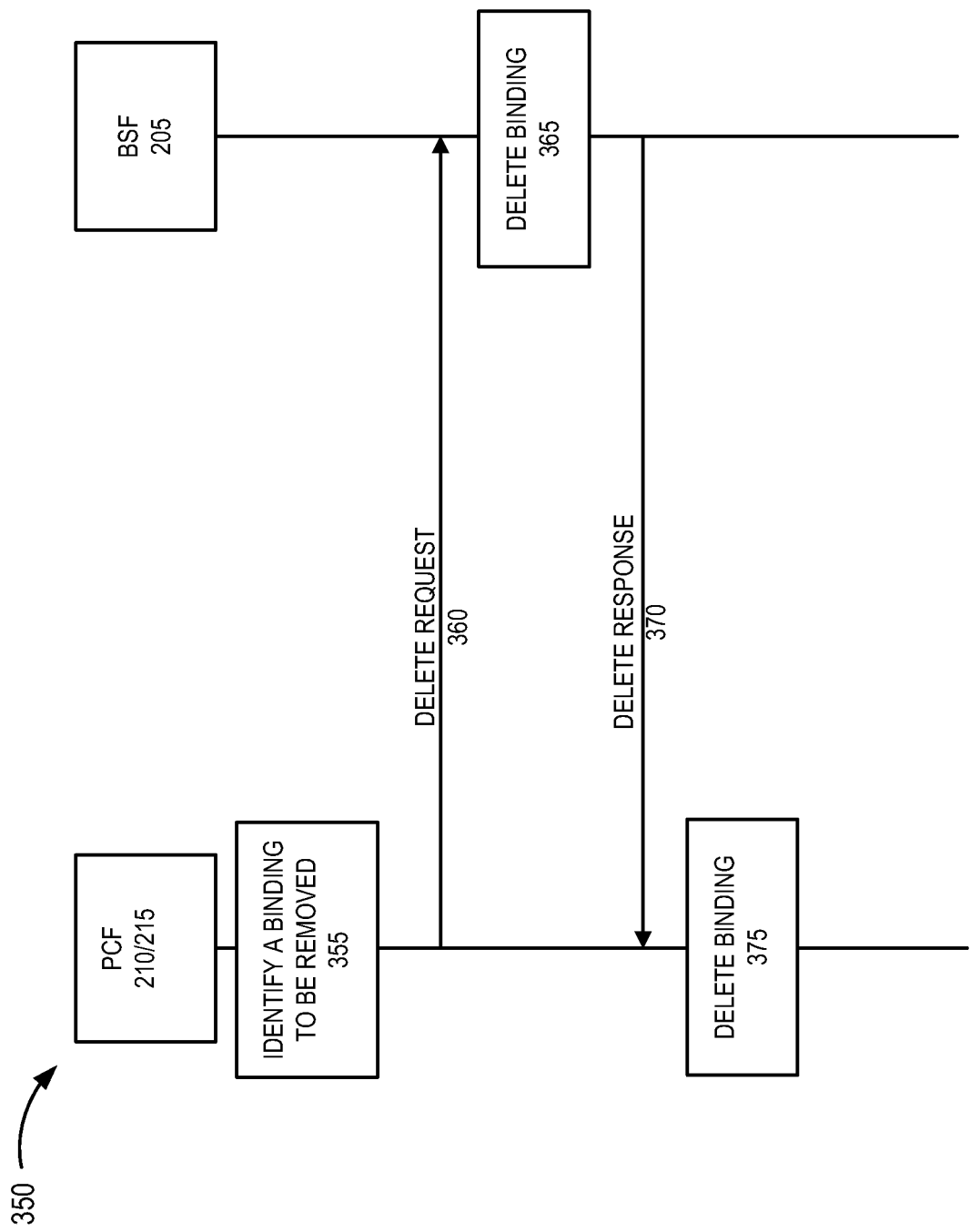
FIG. 3B is a diagram illustrating another exemplary process of an exemplary embodiment of the binding information service.

FIG. 3B is a diagram illustrating an exemplary process 350 of an exemplary embodiment of the binding information service. Referring to FIG. 3B, PCF 210/215 may identify binding information that should not be registered 355 with BSF 205. In contrast to other methods of detection for initiating the deregistration or removal/deletion of binding information at a BSF by a PCF (e.g., when an Internet Protocol (IP) address or a media access control (MAC) address is released for a PDU session), according to an exemplary embodiment, PCF 210/215 may identify binding information deemed to no longer be registrable or active based on one or multiple criteria, as described herein. For example, PCF 210/215 may identify and select binding information to be deleted based on an age of the binding information instance (e.g., an interim period since the binding was created). According to another example, PCF 210/215 may identify and select binding information to be deleted when a policy control association with an AMF/SMF may not exist for a UE/PDU session. According to yet another example, PCF 210/215 may identify and select the binding information based on an amount of time that has elapsed since the last confirmation procedure was executed (e.g., receiving a query request 310 and verifying the state of the binding information 315 of process 300). PCF 210/215 may be configured with one or multiple threshold values pertaining to the one or multiple criteria, as described herein.

In response to the identification and selection of the binding information deemed to no longer be registrable or active, PCF 210/215 may generate and transmit a delete request 360 to BSF 205. Delete request 360 may include the binding identifier and/or the URI of the binding information. In response to receiving delete request 360, BSF 205 may perform a lookup in a repository of binding information (e.g., a database or other suitable storage configuration) based on the binding identifier and/or the URI and, when located, delete the binding information 365. In response to the deletion, BSF 205 may generate and transmit a delete response 370 to PCF 210/215. Delete response 370 may include the binding identifier and/or the URI. In response to receiving delete response 370, PCF 210/215 may also delete the binding 375 and synchronize with BSF 205 and the associated binding information.

FIG. 3B is a diagram illustrating an exemplary process 350 of an exemplary embodiment of the binding information service, however, according to other exemplary embodiments, process 350 may include additional, fewer, or different operations and/or messages. According to some exemplary embodiments, delete request 360 and delete response 370 may be implemented as an HTTP message (e.g., HTTP DELETE request and HTTP "204 No Content"). According to other exemplary embodiments, delete request 360 and delete response 370 may be implemented according to a protocol different from HTTP.

Figure 4:
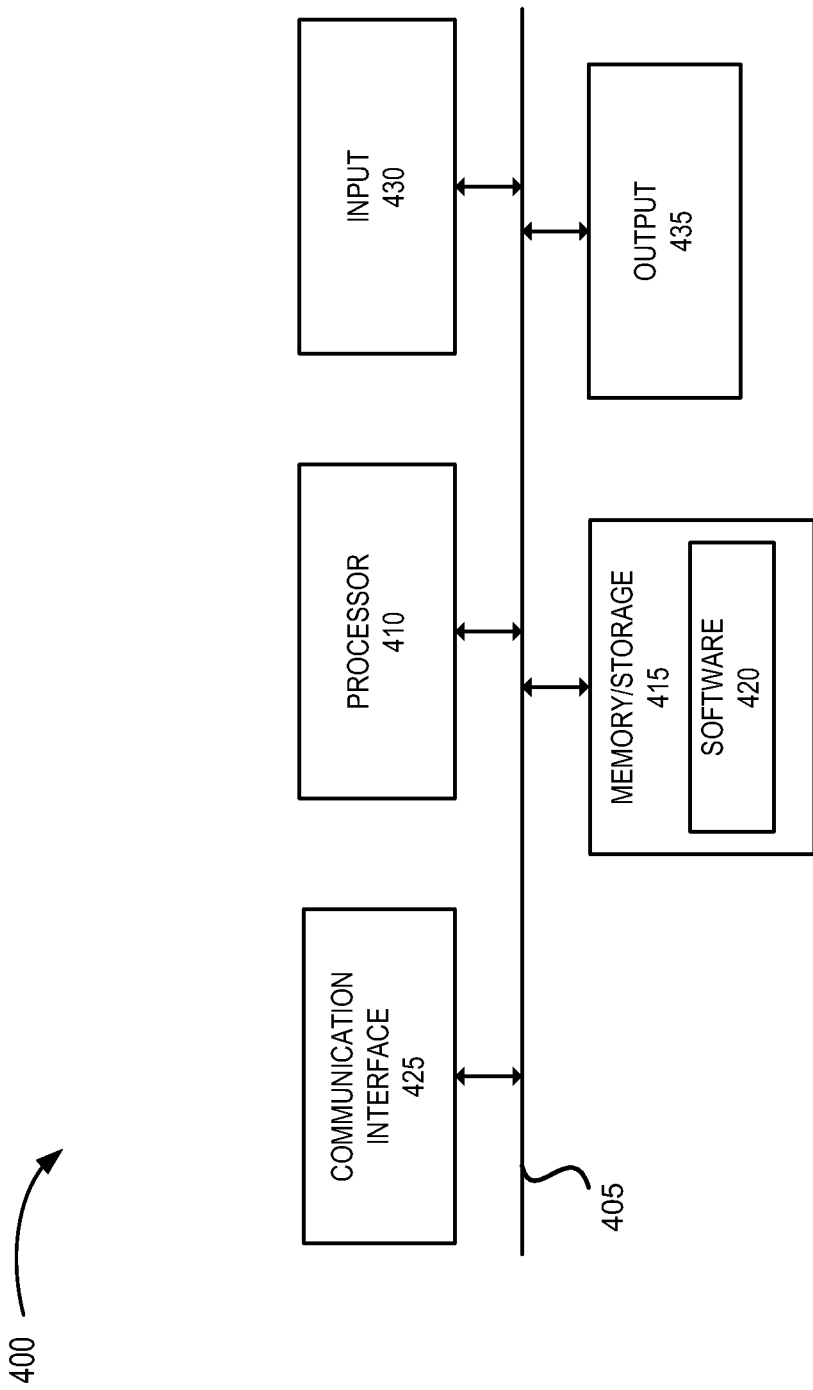
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access devices 110, core devices 155, BSF 205, AM PCF 210, SM PCF 215, NEF 220, AF 225, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, software 420 may include an application that, when executed by processor 410, provides a function of the binding information service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, etc., as previously described.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
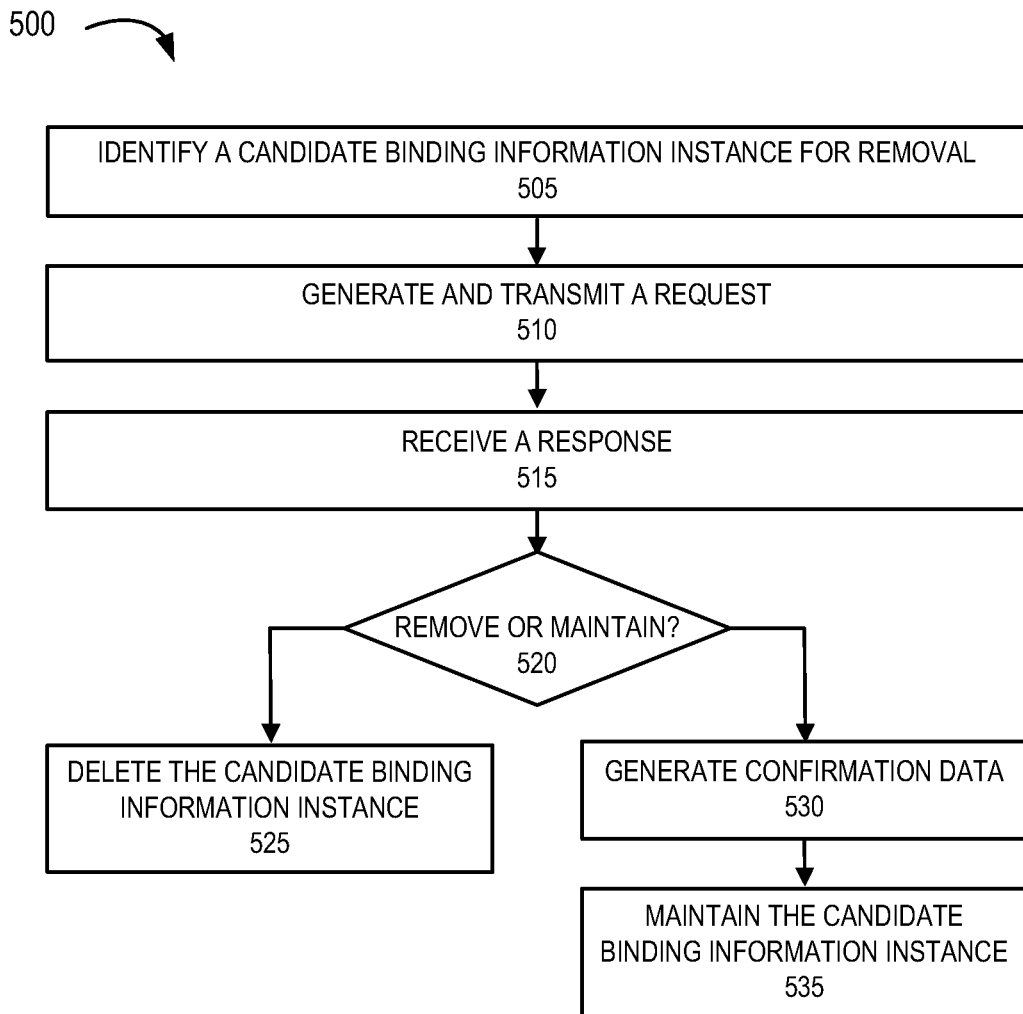
FIG. 5 is a flow diagram illustrating an exemplary process of an exemplary embodiment of the binding information service.

FIG. 5 is a flow diagram illustrating an exemplary process 500 of an exemplary embodiment of the binding information service. According to an exemplary embodiment, a BSF (e.g., BSF 205) may perform steps of process 500. According to an exemplary implementation, processor 410 executes software 420 to perform a step illustrated in FIG. 5 and described herein. Alternatively, a step illustrated in FIG. 5 and described herein, may be performed by execution of only hardware.

In block 505, the BSF may identify a candidate binding information instance to be removed. For example, BSF 205 may determine that a candidate binding information may be subject to deletion based on one or multiple criteria, as described herein. For example, BSF 205 may make this determination based on an age of the binding information instance, how long ago the binding information instance was confirmed as still active or registrable after creation or after a last confirmation of activity or registrability, or another configurable criterion, as described herein. BSF 205 may be configured with one or multiple threshold values pertaining to the one or multiple criteria. BSF 205 may also make other determinations pertaining to the type of end device, the type of PDU session, the type of network slice, and/or other factors based on the binding information instance (e.g., UE information, PDU session information, etc.) and/or other available information.

In block 510, the BSF may generate and transmit a request. For example, BSF 205 generate a query request and transmit the query request to a PCF (e.g., PCF 210/215 or another type of PCF), as described herein. The query request may include a binding identifier and/or a URI of the candidate binding information instance. The PCF may receive the query request and verify the state of the candidate binding information instance, as described herein.

In block 515, the BSF may receive a response. For example, BSF 205 may receive a query response from the PCF, as described herein. Depending on the result of the PCF verification procedure, the query response may include the binding identifier and/or the URI and data indicating that the candidate binding information is not found or that the candidate binding information is no longer registrable or active, as described herein. Alternatively, for example, the query response may include data indicating that the candidate binding information was located or a confirmation that the candidate binding information is registrable or active, as described herein. According to another exemplary embodiment, when no response is received after a threshold amount of time, for example, process 500 may return to block 510. For example, BSF 205 may resend the request. This retry procedure may be limited to a certain number of times.

In block 520, the BSF may determine whether to remove or maintain the candidate binding information instance. For example, based on reading the query response, BSF 205 may make this determination, which may be a binary choice. When the query response includes data that may indicate that the candidate binding information is not found or no longer registrable or active, for example, BSF 205 may delete the candidate binding instance (block 525). When the query response includes data indicating that the candidate binding information was located or is (still) registrable or active, optionally, BSF 205 may generate configuration data, as described herein (block 530). BSF 205 may continue to maintain (e.g., store) the candidate binding information, which may include the confirmation data (block 535).

FIG. 5 illustrates an exemplary process 500 of the binding information service, however, according to other embodiments, process 500 may include additional operations, fewer operations, and/or different operations than those illustrated in FIG. 5 and described herein.

Figure 6:
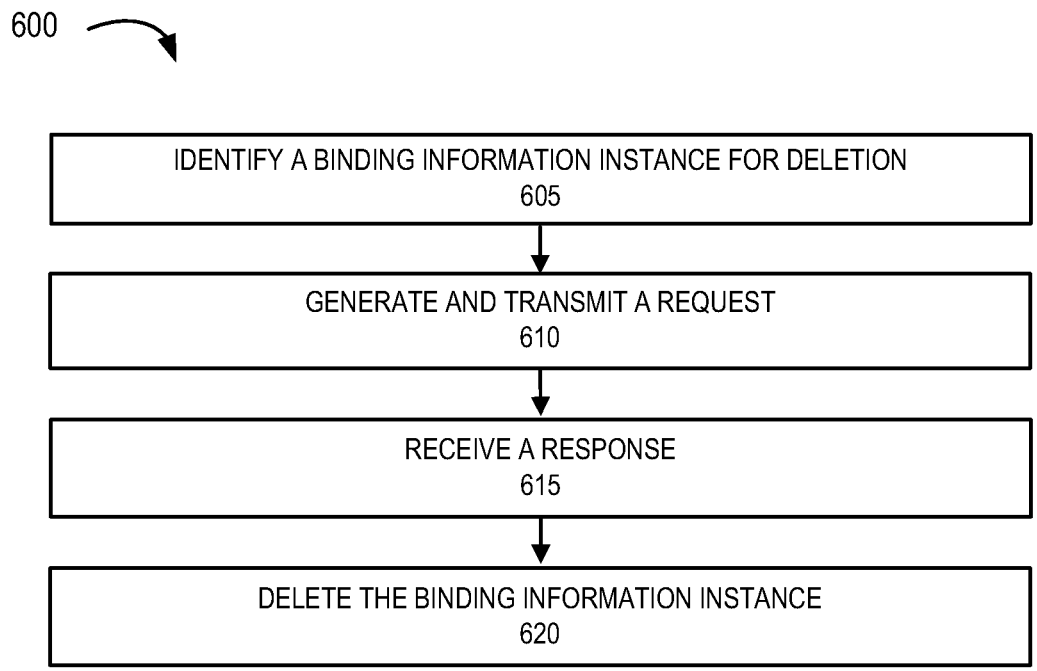
FIG. 6 is a flow diagram illustrating another exemplary process of an exemplary embodiment of the binding information service.

FIG. 6 is a flow diagram illustrating another exemplary process 600 of an exemplary embodiment of the binding information service. According to an exemplary embodiment, a PCF (e.g., an integrated PCF or a dedicated PCF 210 or 215) may perform the steps of process 600. According to an exemplary implementation, processor 410 executes software 420 to perform a step illustrated in FIG. 6 and described herein. Alternatively, a step illustrated in FIG. 6 and described herein, may be performed by execution of only hardware.

In block 605, a PCF may identify a binding information instance for deletion. For example, the PCF may determine that the binding information instance should be deleted based on one or multiple criteria, as described herein. For example, the PCF may make this determination based on an age of the binding information instance, when a policy control association with an AMF/SMF does not exist for a UE/PDU session, and/or how long ago the last confirmation procedure was executed. The PCF may be configured with one or multiple threshold values pertaining to the one or multiple criteria.

In block 610, in response to this determination, the PCF may generate and transmit a request. For example, the PCF may generate and transmit a delete request to BSF 205. The delete request may include a binding identifier and/or a URI of the binding information instance. As described herein, BSF 205 may receive and read the delete request, perform a lookup, and delete the binding information instance. BSF 205 may generate and transmit a response (e.g., a delete response) to the PCF.

In block 615, the PCF may receive a response to the request. For example, the PCF may receive a delete response from BSF 205. The delete response may indicate that the binding information instance has been deleted and may include the binding identifier and/or the URI.

In block 620, the PCF may delete the binding information instance. For example, in response to receiving confirmation BSF 205 deleted the binding information instance, the PCF may delete the binding information instance.

FIG. 6 illustrates an exemplary process 600 of the binding information service, however, according to other embodiments, process 600 may include additional operations, fewer operations, and/or different operations than those illustrated in FIG. 6 and described herein.

As set forth in this description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, according to other embodiments, different types of network devices other than different types of policy control network devices may register, update, and deregister binding information. As such, a BSF or another type of network device may provide a discover service in relation to the binding information for various types of network devices.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
applying, by a binding service function device, at least one criterion to a binding information instance;
identifying, by the binding service function device in response to the applying, that the binding information instance is a candidate instance for removal;
generating, by the binding service function device, a request;
transmitting, by the binding service function device to a policy control network device, the request;
receiving, by the binding service function device from the policy control network device, a response to the request; and
determining, by the binding service function device in response to the receiving, whether to delete or maintain the binding information instance.

2. The method of claim 1, wherein the at least one criterion includes a time period beginning from when the binding information instance was created.

3. The method of claim 1, wherein the at least one criterion includes a time period beginning from when the binding information instance was previously confirmed to be registrable after creation of the binding information instance.

4. The method of claim 1, wherein the applying comprises:
applying, by the binding service function device, an at least one threshold value pertaining to the at least one criterion.

5. The method of claim 1, wherein the response includes data indicating that the binding information instance is at least one of not found or no longer registrable, and the method further comprising:
deleting, by the binding service function device, the binding information instance.

6. The method of claim 1, wherein the response includes data indicating that the binding information instance is at least one of found or is still registrable, and the method further comprising:
maintaining, by the binding service function device, the binding information instance.

7. The method of claim 6, wherein the maintaining further comprises:
generating, by the binding service function device, confirmation data that indicates confirmation of registrability and date and timestamp; and
storing, by the binding service function device, the confirmation data with the binding information instance.

8. The method of claim 1, wherein the binding information instance includes packet data unit (PDU) session information pertaining to an end device.

9. A network device comprising:
a processor configured to:
apply at least one criterion to a binding information instance, wherein the network device is a binding service function device;
identify, in response to the application of the at least one criterion, that the binding information instance is a candidate instance for removal;
generate a request;
transmit, to a policy control network device, the request;
receive, from the policy control network device, a response to the request; and
determine, in response to the receipt of the response, whether to delete or maintain the binding information instance.

10. The network device of claim 9, wherein the at least one criterion includes a time period beginning from when the binding information instance was created.

11. The network device of claim 9, wherein the at least one criterion includes a time period beginning from when the binding information instance was previously confirmed to be registrable after creation of the binding information instance.

12. The network device of claim 9, wherein the processor is further configured to:
apply an at least one threshold value pertaining to the at least one criterion.

13. The network device of claim 9, wherein the response includes data indicating that the binding information instance is at least one of not found or no longer registrable, and the processor is further configured to:
delete the binding information instance.

14. The network device of claim 9, wherein the response includes data indicating that the binding information instance is at least one of found or is still registrable, and the processor is further configured to:
maintain the binding information instance.

15. The network device of claim 14, wherein the processor is further configured to:
generate confirmation data that indicates confirmation of registrability and date and timestamp; and
store the confirmation data with the binding information instance.

16. The network device of claim 9, wherein the binding information instance includes packet data unit (PDU) session information pertaining to an end device.

17. A non-transitory computer-readable storage medium storing instructions executable by a processor of a binding service function device, which when executed cause the binding service function device to:
apply at least one criterion to a binding information instance;
identify, in response to the application of the at least one criterion, that the binding information instance is a candidate instance for removal;
generate a request;
transmit, to a policy control network device, the request;
receive, from the policy control network device, a response to the request; and
determine, in response to the receipt of the response, whether to delete or maintain the binding information instance.

18. The non-transitory computer-readable storage medium of claim 17, wherein the at least one criterion includes a time period beginning from when the binding information instance was previously confirmed to be registrable after creation of the binding information instance.

19. The non-transitory computer-readable storage medium of claim 17, wherein the response includes data indicating that the binding information instance is at least one of found or still registrable, and the instructions further comprise instructions, which when executed cause the binding service function device to:
maintain the binding information instance.

20. The non-transitory computer-readable storage medium of claim 17, wherein the response includes data indicating that the binding information instance is at least one of not found or no longer registrable, and the instructions further comprise instructions, which when executed cause the binding service function device to:
  delete the binding information instance.

* * * * *